US008387340B2

(12) United States Patent
Zimmer et al.

(10) Patent No.: US 8,387,340 B2
(45) Date of Patent: Mar. 5, 2013

(54) ANCHOR FOR A LIGHTWEIGHT CONSTRUCTION PANEL AND ITS INSTALLATION IN THE PANEL

(76) Inventors: Günther Zimmer, Rheinau (DE); Martin Zimmer, Rheinau (DE)

( * ) Notice: Subject to any disclaimer, the term of this patent is extended or adjusted under 35 U.S.C. 154(b) by 438 days.

(21) Appl. No.: 12/655,574

(22) Filed: Dec. 31, 2009

(65) Prior Publication Data

US 2010/0175345 A1  Jul. 15, 2010

Related U.S. Application Data

(63) Continuation-in-part of application No. PCT/DE2008/001094, filed on Jul. 3, 2008.

(30) Foreign Application Priority Data

Jul. 4, 2007 (DE) .......................... 10 2007 031 176

(51) Int. Cl.
  *E04F 13/07* (2006.01)
  *E04C 2/54* (2006.01)
  *F16B 13/04* (2006.01)

(52) U.S. Cl. ............................. 52/787.1; 52/361; 411/32

(58) Field of Classification Search .................... 52/361, 52/362, 364, 787.1; 411/32–34, 43, 57.1, 411/45–48
  See application file for complete search history.

(56) References Cited

U.S. PATENT DOCUMENTS

| | | | |
|---|---|---|---|
| 2,092,344 A | 6/1936 | De Vries | |
| 3,042,156 A * | 7/1962 | Rohe | 52/787.12 |
| 3,227,031 A * | 1/1966 | Williams | 411/26 |
| 4,122,753 A * | 10/1978 | Kuhlmann et al. | 411/2 |
| 4,269,106 A * | 5/1981 | Leibhard et al. | 411/34 |
| 4,514,125 A | 4/1985 | Stol | |
| 4,531,871 A * | 7/1985 | Sigmund | 411/361 |
| 4,679,966 A * | 7/1987 | Yacisin | 405/259.6 |
| 4,806,053 A * | 2/1989 | Herb | 411/32 |
| 4,820,095 A * | 4/1989 | Mraz | 411/82.3 |
| 4,844,673 A * | 7/1989 | Kendall | 411/34 |
| 5,244,314 A * | 9/1993 | Calandra et al. | 405/259.4 |
| 5,256,016 A * | 10/1993 | Godfrey | 411/32 |
| 5,725,341 A * | 3/1998 | Hofmeister | 411/32 |
| 5,733,086 A * | 3/1998 | Jakob | 411/501 |
| 6,017,176 A * | 1/2000 | Marui | 411/82 |
| 6,468,010 B2 * | 10/2002 | Sager et al. | 411/82 |
| 8,046,964 B2 * | 11/2011 | Zimmer et al. | 52/364 |
| 2008/0025811 A1 * | 1/2008 | Auriol et al. | 411/43 |
| 2009/0274533 A1 * | 11/2009 | Zimmer et al. | 411/49 |
| 2009/0274534 A1 * | 11/2009 | Zimmer et al. | 411/57.1 |
| 2010/0115882 A1 * | 5/2010 | Seroiszka et al. | 52/787.1 |
| 2010/0178130 A1 * | 7/2010 | Zimmer et al. | 411/80.2 |
| 2010/0180535 A1 * | 7/2010 | Zimmer et al. | 52/699 |
| 2010/0281817 A1 * | 11/2010 | Zimmer et al. | 52/705 |
| 2010/0287874 A1 * | 11/2010 | Zimmer et al. | 52/699 |
| 2010/0287875 A1 * | 11/2010 | Zimmer et al. | 52/699 |
| 2011/0027037 A1 * | 2/2011 | Zimmer et al. | 411/82 |
| 2011/0083397 A1 * | 4/2011 | Zimmer et al. | 52/699 |
| 2011/0232223 A1 * | 9/2011 | Zimmer et al. | 52/699 |
| 2011/0232224 A1 * | 9/2011 | Zimmer et al. | 52/699 |

* cited by examiner

*Primary Examiner* — Joshua J Michener
*Assistant Examiner* — Elizabeth A Plummer
(74) *Attorney, Agent, or Firm* — Klaus J. Bach (57) ABSTRACT

In an anchor installation in a lightweight construction panel including first and second cover plates with a support core structure disposed between the cover plates, wherein the anchor is installed in a bore so as to extend at least through the first cover plate and the support core to the second support plate, the anchor includes engagement structures for engagement with at least the first cover plate and the support core and also cement containing balloons which are crushed upon insertion of the anchor thereby releasing the cement which solidifies forming a firm connection between the anchor and the first and second cover plates and the support core.

13 Claims, 5 Drawing Sheets

ANCHOR FOR A LIGHTWEIGHT CONSTRUCTION PANEL AND ITS INSTALLATION IN THE PANEL

This is a Continuous-In-Part Application of pending international patent application PCT/DE2008/001094 filed Jul. 3, 2008 and claiming the priority of German patent application 10 2007 031 183.6 filed Jul. 4, 2007.

BACKGROUND OF THE INVENTION

The invention resides in an anchor for mounting to lightweight construction panels including a central support core covered at opposite sides by first and second cover plates, wherein the anchor comprises at least one expansion body with mounting means and at least one wedge body movably disposed in the expansion body.

Flat lightweight construction panels with support cores are often also called sandwich panels, honeycomb panels or lightweight panels. All types of panels used in furniture construction generally have cover plates of thin wood chip plates, medium or high density fiber plates, plywood or hard fiber plates. As central cores or support cores of the sandwich plates, sheets of foamed polyurethane or polystyrol are often used. In honeycomb panels support cores of corrugated web inserts or so-called expanded honeycombs are used as intermediate layers. Most lightweight panels have a density of less than 500 kg/m$^3$. If for the intermediate layers no fire-retardant aluminum foams or foamed glass is used, the raw density is generally less than 350 kg/m$^3$.

If armatures have to be attached to the lightweight panels for example by means of screws, it is a problem that the attachment means can be connected generally only to the relatively thin cover plates or cover layers. To resolve this problem, generally expansion anchors are used as they are disclosed for example in DE 20 2004 000 474 U1. This type of expansion anchors however have the disadvantage that they engage the top cover plate at opposite sides thereof over a large area. The rear engagement fingers displace the support core material in the area around the bore into which the anchor is inserted whereby the cover plate is released easily from the core support material and lifted off when the anchor is subjected to pulling forces.

Another anchor which avoids the disadvantage referred to above is known from the internet brochure (September 2006) of the company Fischer Befestigungssysteme GmbH. It is offered herein under the designation SLM-N. The anchor has a tubular expansion body with a bore in part of which a wedge body is accommodated which is frustro-conical in shape and has a slotted rear expansion body end. The wedge body has a central bore with an internal thread. When for example the wedge body is pulled by tightening a mounting screw disposed in the thread of the wedge body into the expansion body, the expansion body is expanded into tight engagement with the lower part of the bore. However, this anchor could be tightly held only if the core support material would be very rigid.

It is further known from DE 10 2006 049 952 to provide in the central opening of an anchor a bladder filled with a cement. The bladder is ruptured upon insertion of a wedge body whereby the cement is released and the anchor is cemented to the lower cover plate.

It is the object of the present invention to provide an anchor for lightweight construction panels which is easy to install and can be safely and durably retained in the light-weight construction panel. It is not intended for mounting to solid panel inserts or the respective panel transverse members.

SUMMARY OF THE INVENTION

In an anchor installation in a lightweight construction panel including first and second cover plates with a support core structure disposed between the cover plates, wherein the anchor is installed in a bore so as to extend at least through the first cover plate and the support core to the second cover plate, the anchor includes engagement structures for engagement with at least the first cover plate and the support core and it also includes cement-containing balloons which are crushed upon insertion of the anchor thereby releasing the cement which solidifies forming a firm connection between the anchor and the first and second cover plates and the support core.

Preferably, the anchor extends into a dead-end bore formed into the second cover plate and is also mechanically engaged in the dead end bore with the second cover plate.

The anchor according to the invention is suitable for installation in lightweight construction panels in which it can be firmly retained with high axial retaining force. It can easily and safely be installed manually as well as by installation equipment. The anchor is so designed that it is fixed in the lightweight construction plate in two steps. In a first step, the anchor is mechanically engaged in the lightweight construction panel so that it is fixed in position. In a second step, the anchor is cemented by cementing material disposed in the anchor at its opposite ends in such a way that the lower and upper cover plates are rigidly interconnected via the anchor.

The cement is disposed packaged in small balloons in empty spaces of the anchor. The balloons are stored as bulk material in foamed non-sticky pearls within the anchor. The balloons which may consist for example of a brittle enclosure inclosing cement material will be called in the following description micro- or macro-capsules. The micro-capsules have an outer diameter of less than one millimeter. The macro-capsules may have a diameter of up to 3 mm. The capsules may include, for example, a cement which solidifies upon contact with air or air humidity. In the embodiments described herein, two types of capsules are used. One group of capsules includes a first cement component, for example a hardener, and the other group includes a cement material component for example a binder. The two types of capsules are provided in the anchor intermingled at the proper mixing ratio. Depending on the mixing ratio, after destruction of the capsules by compression, for example an expanded, tough, solidly-hardened 2-K polyurethane cement is formed.

Instead of two different microcapsule groups, also multi-chamber capsules may be provided. The individual multi chamber capsules include the two cement components in separate chambers.

The invention will become more readily apparent from the following description of exemplary embodiments shown schematically in the enclosed drawings.

DETAILED DESCRIPTION OF PARTICULAR EMBODIMENTS

Figure 1:
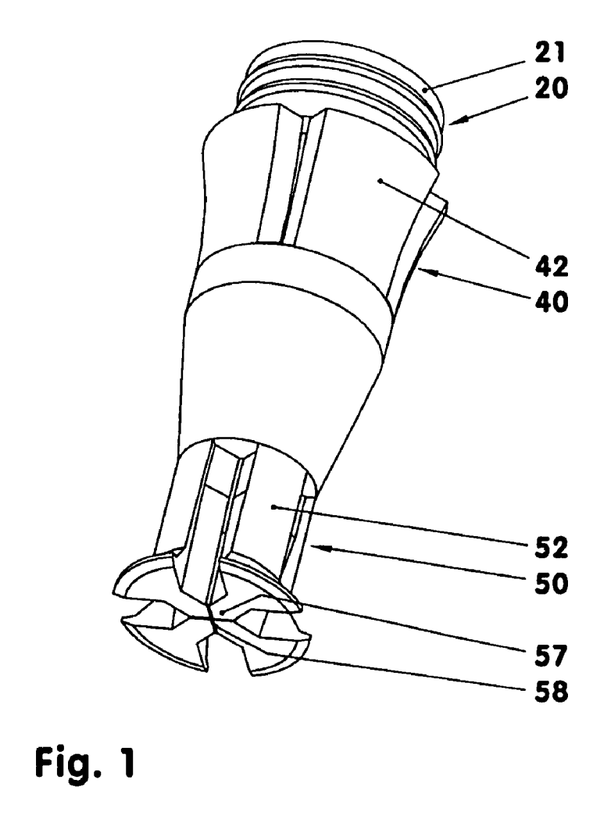
FIG. 1 is a perspective view of an anchor with engagement sections as seen at an angle from below.
Figure 2:
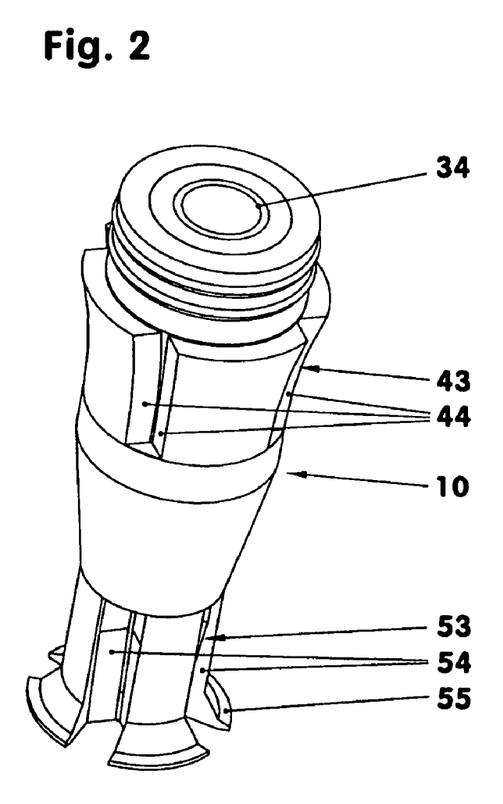
FIG. 2 is a perspective view of the anchor shown in FIG. 1, but as seen at an angle from above.

FIGS. 1 and 2 show an anchor before installation in an undeformed state.

Figure 6:
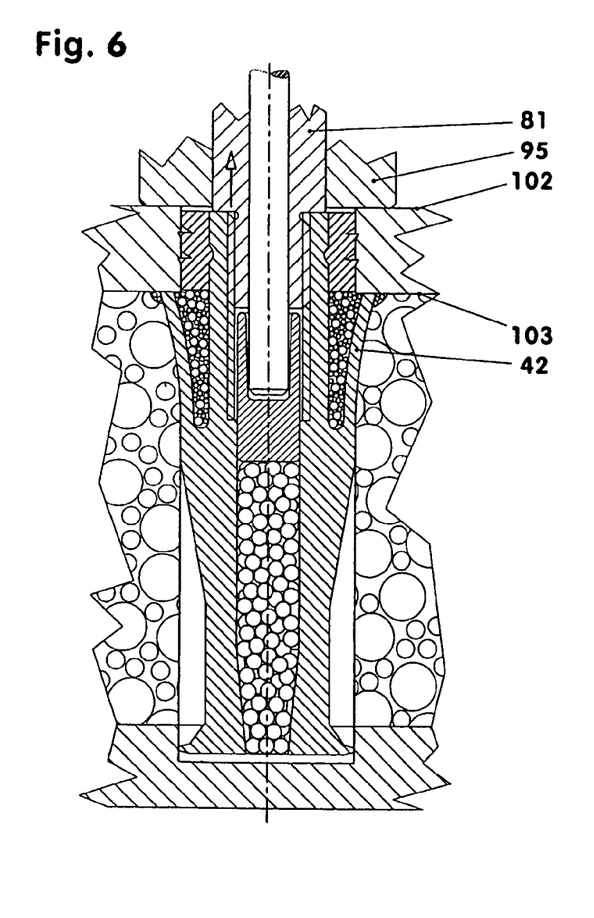
FIG. 6 shows the anchor slightly retracted from its end position.

The anchor has an expansion body 10 which consists of three sections 20, 40, 50. An upper area is an engagement section 20, which comprises a cylindrical section 21. The engagement section 20 is a seating section which includes a central threaded bore 34 for accommodating a mounting element (1) such as a screw, see FIG. 6. An intermediate area forms an engagement section 40, which, in the shown embodiment, comprises four retaining elements 42. The lower section 50 is a spreading section which includes for example four clamping elements 52.

Figure 8:
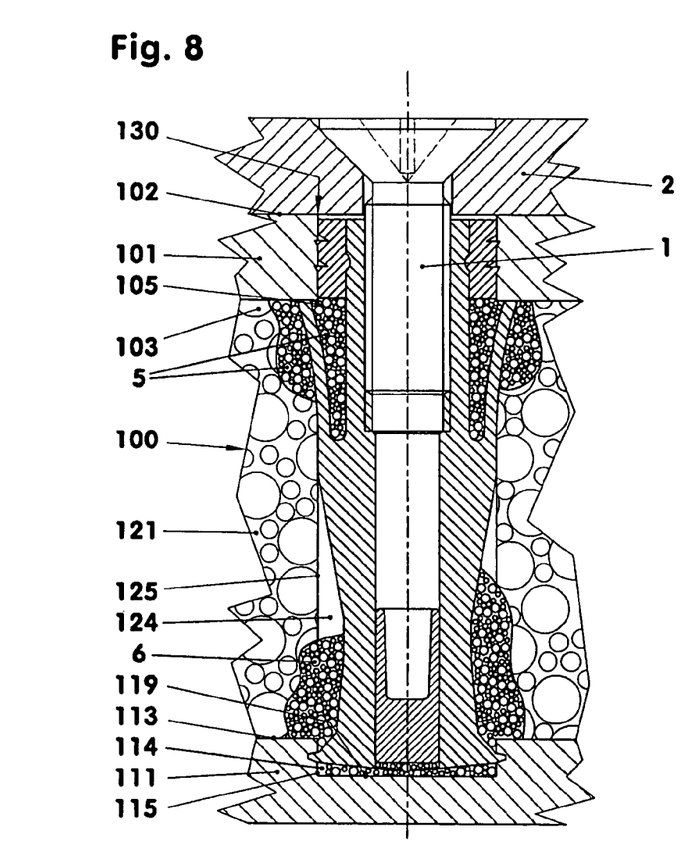
FIG. 8 shows the anchor firmly cemented in position with the installation tool removed and an armature attached.

The anchor is designed for example for mounting armature parts to lightweight construction panels 100 without reinforcement inserts or transverse members, see FIG. 8. The lightweight construction panel 100 comprises two cover plates 101, 111 and an intermediate support core 121. Each cover plate 101, 111 consists in the shown embodiment of a thin wood chip plate. The support core 121 in the present case is a PU (polyurethane) foam core. The cover plates 101, 111 are cemented at their inner surfaces 103, 113 to the plate-like support core 121. The lightweight panel as shown in the figures has a wall thickness of 20 to 40 mm. Each cover plate is 2 to 8 mm thick. Instead of the foamed core, it may include for example a honeycomb core. The lightweight construction panel is provided with a bore 130 which comprises bore sections 105, 125, 115. The latter bore section 115 is a dead end bore. Its depth in the present case corresponds to 25 to 75% of the thickness of the lower cover plate 111. Possibly, in place of the dead end bore 115, a through bore may be provided. For the type of anchor as shown in FIGS. 1 and 2, the dead end bore 115 may have a smaller diameter than the bore sections 105 and 125.

The lightweight construction panel 100 may also be curved, that is, it may be for example cylindrically or spherically curved as long as the material thickness of the support core 121 remains at least essentially constant.

For mounting an anchor, a bore is first drilled through the first cover plate 101 and the support core 121. The dead end bore is drilled into the second cover plate 111 to the desired depth. That is, no through bore is provided in this example. As boring tool, a spiral drill is used for example, which has a tip angle of 180°. Possibly, a spot facer may be used. Depending on the type of anchor, the bore 130 may also be drilled by a stepped drill, for example, if the dead end bore 115 in the lower cover plate 111 is to have a smaller diameter than the other bore sections 105, 125, see FIGS. 4 to 6. The cavity or bore 130 formed thereby is cleaned out by compressed air or by evacuation.

Figure 3:
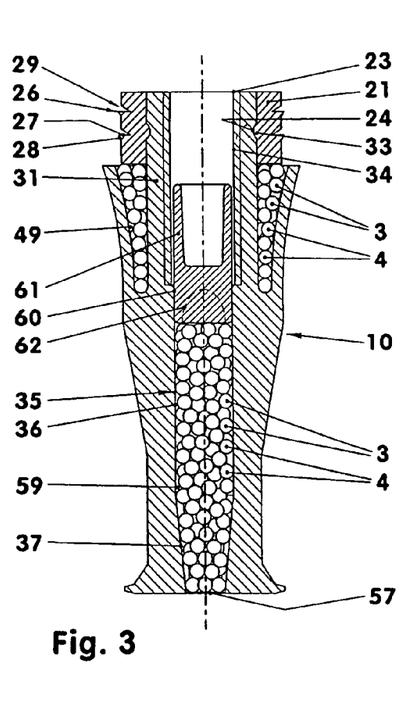
FIG. 3 is a cross-sectional view of the anchor of FIGS. 1 and 2 showing the micro-capsule filling.

FIG. 3 shows an undeformed anchor which includes cavities 49 and 59 filled with a plurality of micro-capsules 3, 4. Both cavities 49, 59 are, in principle, cages in which the microcapsules 3, 4 are safely captured without being hermetically enclosed. The microcapsules shown have in this case a diameter of 0.6 to 0.8 millimeters. The upper cavity 49 is formed by a tubular section 31, the engagement elements 42 disposed around the tubular section 31, and the annular cylinder zone 21 disposed on the tubular section 31 in form-and/or force-locking engagement therewith. The engagement elements 42 form approximately a frustro-conical envelope for the cavity 49. The longitudinal or axial slots 43 disposed between the individual engagement elements 42 have at their greatest width—that is on top—a distance which is for example 2 to 40% smaller than the diameter of the smallest micro-capsule 3, 4. The cavity 49 is delimited upwardly by the lower front face of the cylinder zone 21. Between the lower front face of the cylinder zone 21 and the upper edges of the engagement elements 42, there is a gap whose width is also for example 2 to 40% smaller than the diameter of the smallest micro-capsule 3, 4.

When the anchor is installed in a lightweight construction panel, the cylinder zone 21 extends upwardly to the upper end face of the tube section 31. Between the front face 23 and the top edge of the engagement elements 42, the outer wall of the tube section 31 is provided with a circumferential groove 33. In this groove 33, a circumferential web 24 of the cylinder zone 21 is accommodated for axially fixing the cylinder zone 21 to the tube section 31.

The cylinder zone 21 includes two circumferential barbed webs 26. The closed circumferential barbed webs 26 have a triangular cross-section (FIG. 3) with a support flank 27 and a slide flank 28. They project about 0.15 mm beyond the cylindrical outer contour of the cylinder zone 21. Above each barbed web, there is a circumferential annular channel 29, which also has a triangular cross-section. Each individual channel 29 is so formed that the area of the support flank is enlarged. The contour of annular channel 29 and barbed web 26 is Z-shaped. With this special contour, the barbed webs 26 are resilient in the impression direction.

The barbed webs 26 provide, among others, for a rotation-free clamping of the expansion body 10 in the bore 105. In addition, they seal the assembly gaps between the expansion body 10 and the lightweight building component so that, there, neither dirt nor humidity can enter. Also, support core material cannot exit to the ambient.

Alternatively, the engagement section 20 may include a plurality of axial slots. All longitudinal webs extend parallel to the center line 9 of the anchor. Also in this case, each web has a triangular cross-section wherein its flanks extend for example at an angle of 90 relative to each other. Expediently, the cross-section of the webs increases from top toward the bottom. This increases the tightness of the assembly gap.

The engagement elements 42 according to FIGS. 1 and 2 have side surfaces 44, which extend essentially parallel to one another. As a result, the slot width is smallest at the inside of the engagement elements 42, see FIG. 9.

Figure 9:
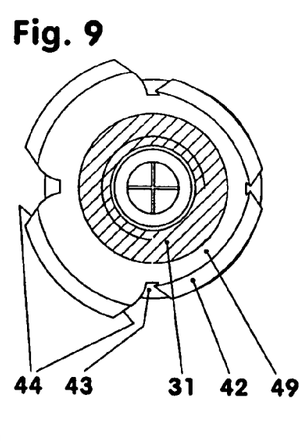
FIG. 9 is a cross-sectional view of FIG. 2 taken below the seating section with half the engagement elements bent outwardly behind the top cover plate of the construction panel.

FIG. 9 shows a cross-section of the anchor of FIGS. 1 and 2 taken directly below the engagement section 20. The cavity 49 is not shown filled in this view. The left side of the anchor is shown undeformed, that is, spread out whereas the right side of the anchor is shown deformed that is bent inwardly, as shown in the position of FIG. 4.

Figure 10:
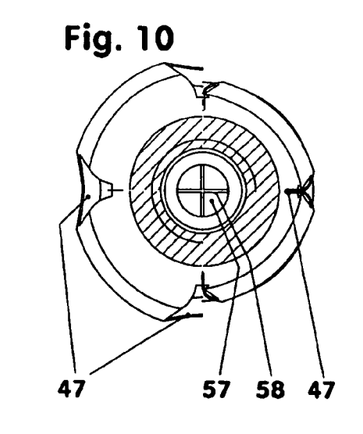
FIG. 10 is a view like FIG. 9 showing additionally foil bridges between adjacent engagement elements.

FIG. 10 shows an arrangement wherein a foil bride 47 extends between two opposite side surfaces 44. Expediently, each foil bridge 47 is also cemented to the base of the respective axial slot 43. The foil bridge 47 prevents an excessively fast flow-out of the cement material or cement components stored in the microcomputers 3.4 into the cavity 124 of the lightweight construction panel 100.

Figure 11:
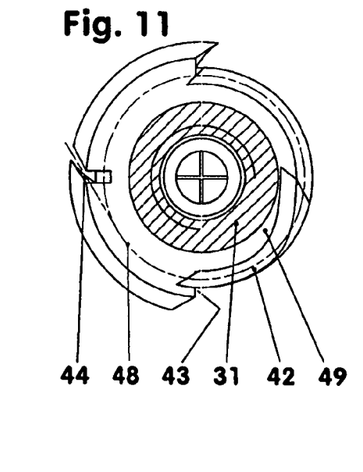
FIG. 11 is a view like FIG. 9 showing however overlapping engagement elements.

FIG. 11 shows another type of engagement elements 42. In this design, the axial slots 43 of the undeformed engagement section 40 have the same width over their full length. In addition, the axial slots 43 do not extend radially, but longitudinally with respect to an imaginary circle or, respectively, imaginary cylinder 48. The diameter of the imaginary cylinder 48 is greater than the outer diameter of the tube section 31. In place of the imaginary cylinder 48, an auxiliary truncated cone may be used. Upon deformation of the engagement elements 42—see FIG. 4—the adjacent engagement elements 42 slide one over the other in a scale-like manner—see the right side of FIG. 11.

Figure 4:
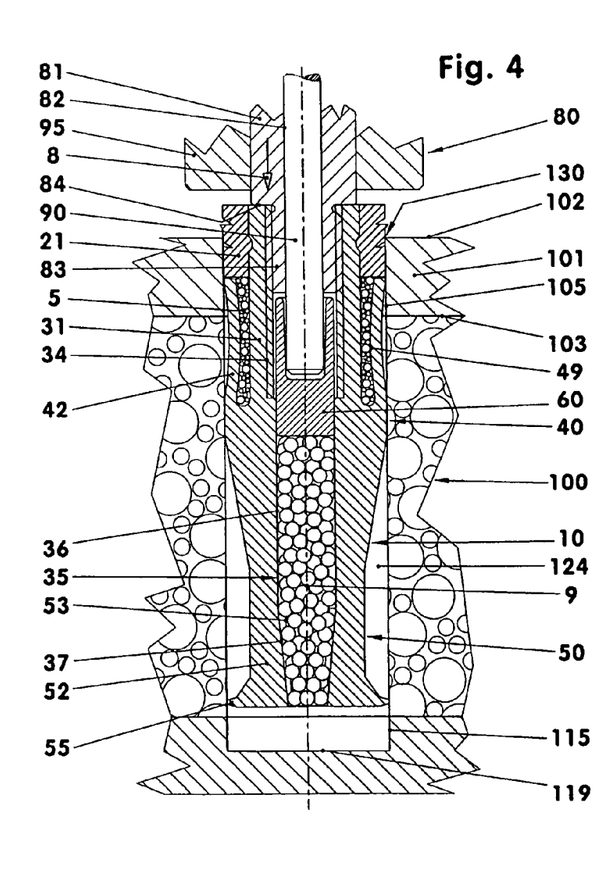
FIG. 4 shows the anchor with an installation tool partially installed.

FIG. 4 shows the anchor during insertion into the bore 130 of a lightweight construction panel 100 using an anchor installation tool 80. The engagement elements 42 are shown in the process of passing through the upper cover plate 101, while being deformed and compressing the micro-capsules 3, 4.

The anchor installation tool 80 comprises at least a holding tube 81, an expansion plunger 90 and a downholder 95.

The holding tube 81 is for example a tubular component which is provided with a through bore 8 and has, at its front end, a threaded section 83. For accommodating the anchor, the threaded section 83 is threaded into the threaded bore 34 of the anchor. In connection with anchors whose central bores are not threaded, the holding tube 81 engages the anchor in the central bore for example by means of frictional engagement elements.

Alternatively, the bore 34 may have a rectangular, an oval, a polygon-like or star-like shape. Expediently, the bore or opening cross-section becomes smaller from the entrance opening toward the end of the bore. It is noted that appropriate engagement elements exist for all forms.

In the bore of the holding tube 81, an expansion plunger 90 is axially movably supported. The holding tube 81 itself is axially guided in the downholder 95.

The holding tube 81 is provided with a shoulder 84 which abuts the upper front face 23 of the anchor. The downholder 95 is disposed on the surface 103 of the lightweight construction panel 100.

The anchor is shown in FIG. 4 with its cylinder zone 21 not yet fully inserted into the bore 105. Adjacent the cylinder zone 21, there is a tube section 31. The tube section 31 ends at the bottom of the cavity 49. It is surrounded by the engagement section 40.

The engagement section 40 in the shown embodiment comprises four engagement elements 42 formed from the engagement section 40. The elastic engagement elements 42 are spread outwardly as shown in FIG. 3, for example, in the shape of a sickle. They end shortly below the cylinder zone 21. Their maximum outer diameter is for example 2 to 3 in greater than the inner diameter of the bore 105. The side walls of the engagement elements 42, that is, the walls adjacent the axial slots 43 are disposed for example in planes in which also the center line 9 of the anchor is disposed.

The engagement elements 42 may for example also be arranged along a ring which is disposed on the expansion body 10 separately and in a form-locking manner.

The threaded bore 34 of the cylinder zone 21 continues into tube section 31. The tube section 31 has an outer radius which is smaller than the difference between the radius of the cylinder and the wall thickness of an individual engagement element 42.

Below the engagement elements 42, there is the lower spreading section 50 which becomes narrower downwardly, that is, in the direction toward the bottom 119 of the dead end bore 115. In the spreading section 50, there is a bore 35 which is in the center area of the anchor cylindrical but is cone-shaped in the lower part of the anchor. In the frustro-conical area 37, the bore 35 is provided with four axial slots 53 for forming four clamping elements 52—see FIG. 2. The axial slots 53 have, when undeformed, a constant minimum gap width between the side walls 54 of the clamping elements 52. The slots extend in the embodiment for example in each case in the extension of the axial slots 43. The side walls of the clamping elements 52 may be, at least in areas thereof, oriented like the side walls of the engagement elements 42.

The axial slots 53 like the axial slots 43 are spaced circumferentially by 90°. They may have a spiral, a zig-zag, a meander or a scallop shape. For avoiding stress concentrations, the axial slots 53 may end in radial rounded openings.

The lower end of the bore 35 is closed by means of four thin-walled bottom webs 57. Each bottom web 57 is formed integrally with the clamping element 52 by which it is supported. Between the individual bottom webs 57, there is in each case a bottom slot 58. The axial slots 53 and the bottom slots 58 each have a largest gap width which may be for example 2 to 40% smaller than the diameter of the smallest microcapsule 3, 4.

Directly above the bottom web 57, the lower end of the bore 35 has, in accordance with FIG. 3, an inner diameter which is greater than half the inner diameter of the cylinder section 36 of the bore 35.

At the outside of the lower end of the lower spreading section 50, a radially projecting circumferential web 55 is arranged. The circumferential web 55 is in each case interrupted by the axial slots 53. The web 55, for example, has a radial height of about 0.3 to 1 mm. The maximum diameter of the web 55 is—with the engagement elements 52 undeformed—smaller than the inner diameter of the bore 115, see FIG. 5.

Alternatively, instead of the web 55, a single or multi-pitch thread, circumferential corrugations or a nub-structure may be provided.

In FIG. 3, a wedge body 60 is shown in the anchor, see also FIGS. 4 to 8. The wedge body 60 is an essentially cylindrical component which is disposed in the cylindrical section 36 of the bore 35 as long as the anchor is not fully installed. At its cylindrical outer surface support projection or similar structures may be provided which are accommodated in support recesses of the bore 35. In this way, the wedge body 60 can be locked safely in predetermined positions.

Figure 7:
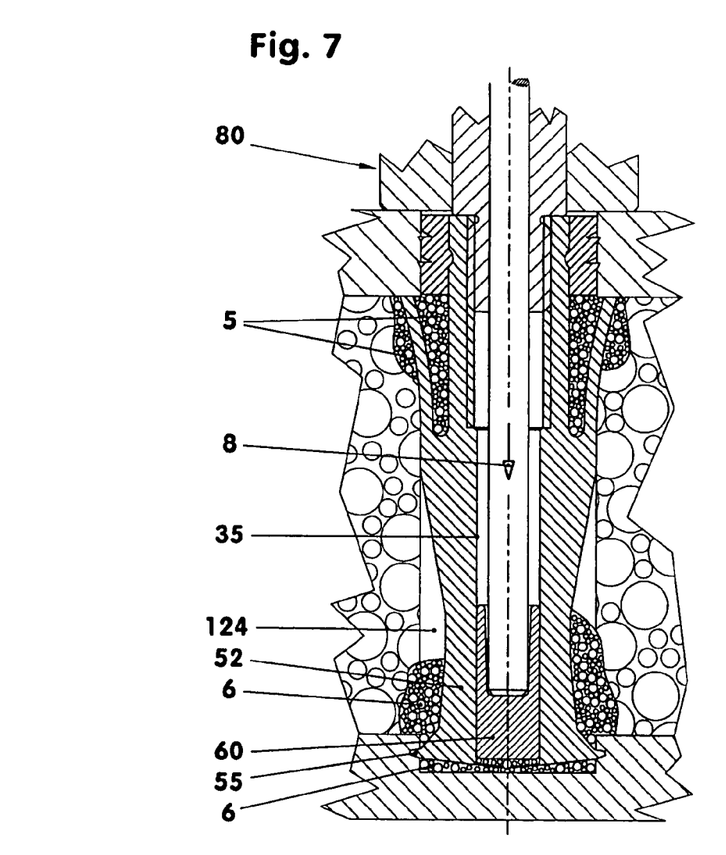
FIG. 7 is a view like FIG. 6 with the wedge body moved down by the installation tool.

At its side adjacent its engagement section 20, the wedge body 60 has for example a wedge body sleeve 61. With this sleeve 61, the length of the wedge body 60 is extended so that in its lowermost position as shown in FIGS. 7 and 8, the axial slots 53 are closed by the wedge body, that is, at least the upper ends thereof.

The wedge body 60 may be provided at its bottom end with a wedge cavity 62 as indicated in FIG. 3 by a dashed line.

In the embodiments shown, the wedge body 60 is at least mostly a cylindrical, rotationally symmetrical body. Alternatively, it may have at least partially a square, a polygonal, an oval or other cross-section. The wedge body 60 may be connected to the expansion body 10 for example by means of a thread so that the wedge body 60 can be inserted not by a linear non-rotating movement but by a rotational threading movement.

The expansion body 10 and the wedge body 60 consist both of a plastic material, for example of polyamide.

Figure 5:
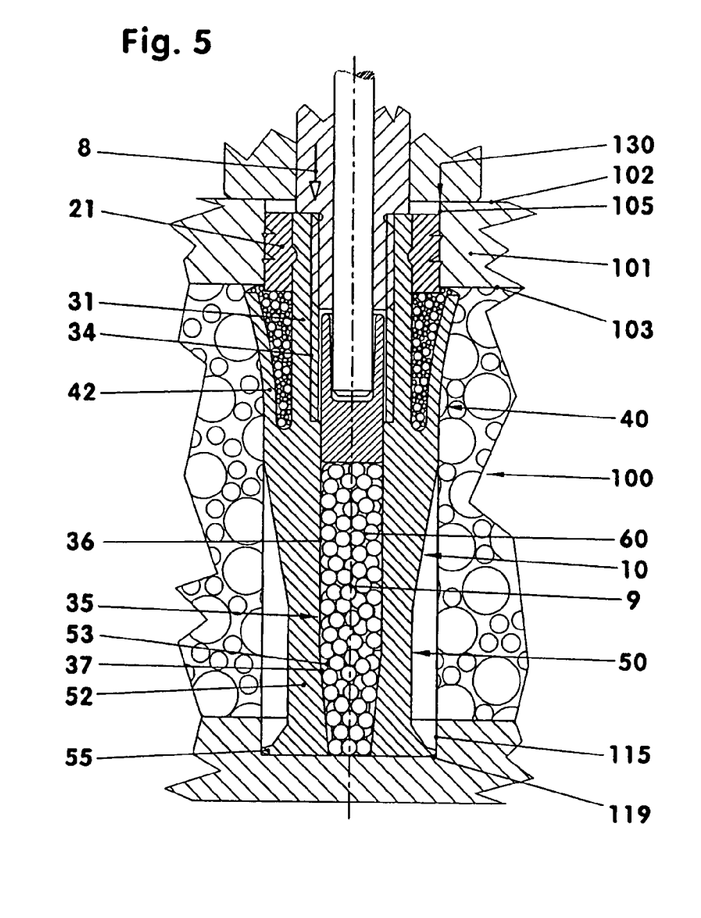
FIG. 5 is a view like FIG. 4 with the anchor fully inserted.

FIG. 5 shows the expansion body 10 after a first installation movement into the bore 130. In this step, the expansion body 10 is inserted into the bore 130 for example to such an extent that it is in contact with the bottom wall 119 of the dead end bore 115 or very close to the bottom wall 119. In this way, it is insured that the engagement elements 42, which, during insertion through the bore 10 are pressed radially against the tube section 31 are released after passing through the first cover plate 101 and automatically spread apart from the tube section 31 below the first cover plate 101. In the cavity 49 now, the cement components discharged from the microcapsules 3, 4 popped during insertion of the anchor now mix while being foamed. Within a few minutes, a cement foam is established which has a volume of 4 to 12 times the volume of the cement components enclosed in the microspheres. The foam expands among others via the axial slots 43 into the cavity 124 in the support core.

It is also possible to provide in the upper area of the engagement elements 42 some radial passages to permit flow of foam 5 also through these passages.

After the engagement elements 42 are spread apart, the expansion body 10 is retracted by the holding tube 81 in order to bring the upper edges of the engagement elements 42 into contact with the lower inner surface 103 of the first or upper cover plate 101. In the meantime, the upper edge surfaces of the engagement elements 42 are already wetted by the cement foam 5, see FIG. 5. Upon retraction of the anchor, the anchor installation tool 80 is supported via the down-holder 95 on the outer surface 102 of the cover plate—see FIG. 6. The top front face 23 of the expansion body 10 is now disposed slightly below the outer surface 102 of the cover plate 101. The engagement elements 42, the tube section 31, the cylinder zone 21 and the upper cover plate 101 are all cemented together. Even the upper anchor part or at least parts thereof and the support core 121 are cemented together. By design however, the foam 5 cannot enter the threaded bore 34.

In a further installation step, the clamping elements 52 of the expansion body 10 are engaged in the dead end bore 115, see FIG. 7. To this end, the anchor installation tool 80 is held in position, that is, the downholder 95 and the holding tube 8 are held fixed relative to each other while the expansion plunger 90 is moved against the wedge body 60 in order to push it in anchor installation direction 8 downwardly into the bore 35. In this step, the microcapsules 3, 4 disposed in the cavity 59 are compressed such that at least most of them rupture. As soon as the wedge body 60 enters the conical area 37 of the downwardly narrowing bore 35, the clamping elements 52 are being spread essentially radially outwardly. The cement components released from the micro-capsules 3, 4 are discharged, mixed in the form of cement foam 6, through the axial slots 53, 58 to the side and also downwardly. At the same time, sections of the webs 55 are firmly engaged with the wall of the dead end bore 115. The clamping procedure is completed only when the wedge body 60 has almost reached the bottom end of the expansion body 10, see FIG. 7. The bore 35 now has an at least approximately cylindrical shape. The axial slots 53 are spread apart to the maximum degree and completely covered by the wedge body 60, at least in upward direction. The anchor is now firmly installed in the lightweight construction panel 100. The foam 6 has not entered the bore 35 or the threaded bore 3. The foam 6 expands into the cavities 114, 124. It cements together the lower spreading section 50 and the second or lower cover plate 111 and also the lower area of the support core 121.

Subsequently, the expansion plunger 90 is retracted, the holding tube 81 is unscrewed from the threaded bore 34 and the anchor installation tool 80 is moved away from the lightweight construction panel 100.

Figure 12:
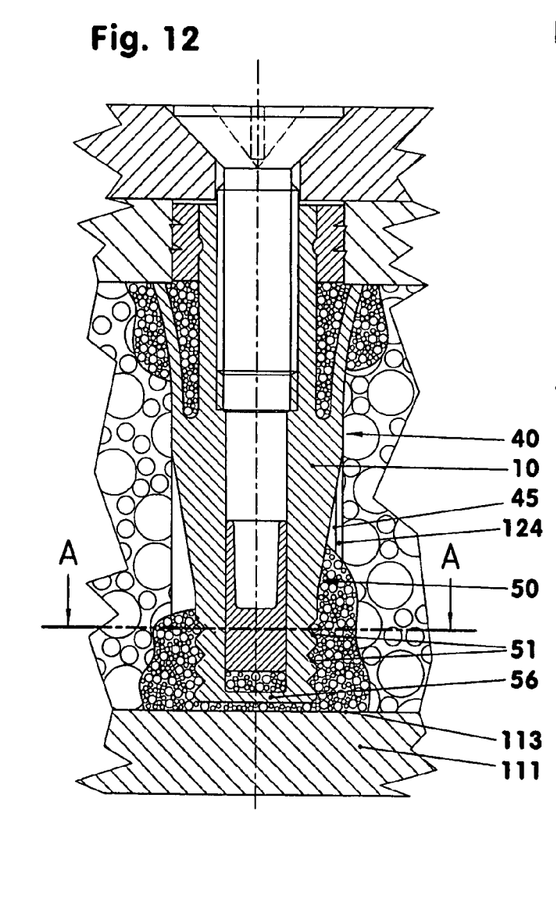
FIG. 12 is a longitudinal cross-sectional view of an anchor installed in a construction panel bore which ends ahead of the second cover plate.

FIGS. 8 and 12 show some armature 2 attached to the lightweight construction panel 100. The armature 2 is attached by means of a flathead screw 1 screwed into the installed expansion body 10. From this representation, it is also apparent that the foams 5 and 6 have reached their maximum expansion. With this, expansion, it is ensured that the two cover plates 101, 111 are firmly connected to the anchor via the cured cement also in a material interlocking manner.

The anchor as shown in FIG. 12 has an expansion body 10, which ends in front of the inner top surface 113 of the lower cover plate 111. The distance between the front face of the expansion body 10 and the surface 113 is for example 0.1 to 3 mm.

Figure 13:
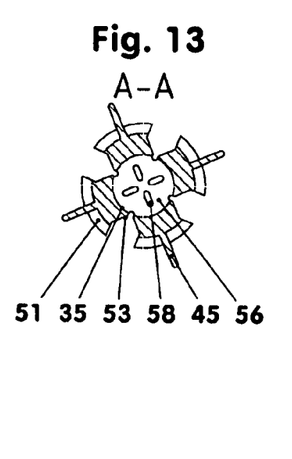
FIG. 13 is a cross-sectional view of the anchor of FIG. 12.

In this embodiment, the expansion body 10 has a cylindrical bore 35 which ends ahead of the bottom wall 56. The bore 35 is connected in the spreading section 50 with the area surrounding the anchor via the axial slots 53. The axial slots 53 have the shape as shown in FIGS. 1 and 2, see also FIG. 13. The bottom wall 56, which may also be curved concavely, also includes bottom slots 58, which, however, are displaced with regard to the axial slots 53.

In the shown embodiment, the lower spreading section 50 is provided with for example several circumferential grooves 51. They have for example triangular or different individual shapes. Instead of annular grooves the lower spreading section 50 may also be provided with an outer thread.

The expansion body 10 may be provided in the areas between the axial slots 53 additionally for example with radially oriented guide-vane like ribs 45, whose maximum radial extension may be up to the diameter of the cylinder zone 21. For improving the cement jointure, the surfaces of the ribs and/or the outer surface of the bottom wall 56 may be structured. The ribs 45 extend up to the engagement sections 40.

During compression of the microcapsules 13, 14, the cement components pass via the axial or longitudinal slots 53, 58 into the cavity 124 surrounding the anchor.

Alternatively, also in this anchor, the spreading section 50 may have the same shape as shown in FIGS. 1 and 2. The expansion body 10 would then be spread apart in the support core 121 and would additionally be engaged therein. The cement would be distributed in the cavity 124 in the support core 121.

Furthermore, the expansion body 10 can be so shaped that the central bore 35 remains closed or it is fully eliminated. In this case, the micro-capsules 3, 4 are stored in the cavity 49 whose expanding foam 5 is cemented to the two cover plates 101, 111 after installation of the anchor. The wedge body 60 is omitted in this variant.

Of course, the inventive anchoring concept is not limited to anchors with at least partially cylindrical outer contours. The anchor may also be designed for openings with at least partially elongated or oval cross-sections.

REFERENCE NUMERALS

| | |
|---|---|
| 1 | Screw |
| 2 | Armature |

-continued

| | |
|---|---|
| 3, 4 | Microcapsules |
| 5, 6 | Cement foam |
| 8 | Installation direction |
| 9 | Centerline of anchor |
| 10 | Expansion body |
| 20 | Engagement section |
| 21 | Cylinder zone |
| 23 | Front face |
| 24 | Circumferential web |
| 26 | Structured surface, barbed webs |
| 27 | Support flank |
| 28 | Side flank |
| 29 | Annular channel |
| 31 | Tube section |
| 33 | Circumferential groove |
| 34 | Central threaded bore |
| 35 | Central bore |
| 36 | Cylindrical section of bore |
| 37 | Frustro-conical area of bore |
| 40 | Engagement section |
| 42 | Engagement elements |
| 43 | Axial slots |
| 44 | Side surface |
| 45 | Radial ribs |
| 47 | Foil bridge |
| 48 | Auxiliary circle or cylinder |
| 49 | Cavity |
| 50 | Lower spreading section |
| 51 | Circumferential groove |
| 52 | Clamping elements |
| 53 | Axial slot |
| 54 | Side wall |
| 55 | Circumferential web |
| 56 | Bottom wall |
| 57 | Bottom web |
| 58 | Bottom slot |
| 59 | Cavity in lower section (50) |
| 60 | Wedge body |
| 61 | Wedge body sleeve |
| 62 | Wedge cavity |
| 80 | Installation tool |
| 81 | Holding tube |
| 82 | Through bore |
| 83 | Threaded section |
| 84 | Shoulder |
| 90 | Expansion plunger |
| 95 | Down holder |
| 100 | Lightweight construction panel |
| 101 | Upper cover plate |
| 102 | Outer surface of cover plate |
| 103 | Inner surface |
| 105 | Bore |
| 111 | Lower cover plate |
| 113 | Inner surface |
| 114 | Cavity |
| 115 | Dead end bore |
| 119 | Bottom of dead end bore |
| 121 | Support core |
| 124 | Cavity in support core |
| 125 | Bore |
| 130 | Bore |

What is claimed is:

1. An anchor installation in a lightweight construction panel (100) comprising:

a support core (121) with respective first and second cover plates (101 and 111) disposed at opposite sides of the support core (121);

said anchor including an expansion body (10) provided with a central receiving bore (35) with a threaded bore section (34) for accommodating an anchor installation tool (80);

a wedge body (60) movably supported in the expansion body (10);

said anchor being disposed in a panel bore (130) of the construction panel (100), wherein said panel bore (130) extends through the first cover plate (101) and the support core (121);

said expansion body (10) including engagement elements (42) which are spread apart in the support core (121) behind the first cover plate (101);

said anchor including an upper and a lower cavity (49, 59), wherein the volume of each of the upper and lower cavity is temporarily reduced during installation of the anchor into the panel bore (130), and the upper and lower cavity each include a plurality of cement-containing balloons (3, 4), and the upper and lower cavity each has at least one opening of a maximum width which is smaller than the smallest cement-containing balloon (3, 4) contained in each of the upper and lower cavity (49, 59) respectively so that, during temporary reduction of the upper and lower cavity volume during insertion of the anchor, the cement-containing balloons (3, 4) are ruptured and cement content is discharged from each of the upper and lower cavity via the at least one opening and the cement content is solidified.

2. The anchor installation according to claim 1, wherein the panel bore (130) extends partially through the second cover plate (111) to form therein a dead end bore (115) and the expansion body (10) further includes opposite clamping elements (52) which extend into the dead end bore (115) and are spread apart in the dead end bore (115) for radial engagement with the dead end bore (115).

3. The anchor installation according to claim 2, wherein the expansion body (10) has a lower section (50) further including axial slots (53) for forming the clamping elements (52).

4. The anchor installation according to claim 3, wherein the wedge body (60) has a length which exceeds the length of the axial slots (53) between the clamping elements (52).

5. The anchor installation according to claim 1, wherein the cement-containing balloons (3, 4) in the upper and lower cavity contain different cement material components which, when intermixed upon rupture of the cement-containing balloons (3, 4), form a solid adherent mass.

6. The anchor installation according to claim 1, wherein the upper cavity (49) is delimited by the engagement elements (42) and an engagement section (20) of the anchor in the first cover plate (101).

7. The anchor installation according to claim 1, wherein the receiving bore (35) in the expansion body (10) further includes an upper cylindrical section (36) and a truncated cone-shaped section (37) for receiving and guiding the wedge body (60).

8. The anchor installation according to claim 7, wherein the lower cavity (59) narrows towards the bottom end of the lower cavity (59) and the wedge body (60) is disposed in the upper cylindrical section (36) and closes the lower cavity (59) at the top of the lower cavity (59).

9. The anchor installation according to claim 7, wherein the central receiving bore (35) in the expansion body (10) is cylindrical and is provided at the lower end of the expansion body (10) with a bottom wall (56) which includes openings (58) and the wedge body (60) is movably disposed in the central receiving bore (35) and the lower cavity (59), and the lower cavity (59) is expandable by the wedge body (60).

10. The anchor installation according to claim 1, wherein the expansion body (10) has a cylinder zone (21) which includes a structure surface (26) in engagement with a bore wall of the first cover plate (101) for rotationally fixing the anchor when installed in the panel bore (130).

11. The anchor installation according to claim 1, wherein the expansion body (10) has a lower section (50) with several radially extending axial slots (53).

12. A method for installing an anchor in a lightweight construction panel (100) said method for installing the anchor comprising the steps of:

providing an anchor installation with a support core (121) with respective first and second cover plates (101 and 111) disposed at opposite sides of the support core (121), said anchor including an expansion body (10) and a wedge body (60) movably supported in the expansion body (10), said anchor being disposed in a panel bore (130) of the lightweight construction panel (100), the panel bore (130) extending through the first cover plate (101) and the support core (121), and partially though the second cover plate (111) to form therein a dead end bore (115), said expansion body (10) including engagement elements (42) and opposite clamping elements (52), said anchor further including an upper cavity (49) whose volume is temporarily reduced during installation of the anchor in the panel bore (130), the upper cavity (49) including a plurality of cement-containing balloons (3, 4), the cement-containing balloons containing different cement components, and the upper cavity (49) including at least one opening of a maximum width which is smaller than the smallest of the cement-containing balloons (3, 4) so that, during temporary reduction of the upper cavity volume, the cement-containing balloons (3, 4) are ruptured and cement content is discharged from the upper cavity (49) via the at least one opening and the cement content is solidified, placing on the anchor an anchor installation tool (80);

inserting the anchor into the panel bore (130) by means of the anchor installation tool (80) so that the engagement elements (42) are compressed and pivoted inwardly during passage of the anchor through the first cover plate (101), thereby temporarily reducing the volume of the upper cavity (49) and rupturing the cement-containing balloons (3, 4) in the upper cavity, discharging cement content in the cement-containing balloons (3, 4), and the cement content is discharged from the upper cavity (49) via the at least one opening and further inserting the anchor such that the engagement elements (42) are spread apart in the support core (121) behind the first cover plate (101) when the engagement elements (42) are located below the first cover plate (101) and in the area of the support core (121), and moving the wedge body (60), with the expansion body (10) fixed in position by the anchor installation (80), downwardly for spreading the opposite clamping elements (52) apart and into radial engagement with a wall section of the dead end bore (115), causing the cement content from the cement-containing balloons (3, 4) to mix and create a mixture, the mixture contacting at least one of the first and second cover plates (101, 11) via openings between the opposite clamping elements (52) to firmly cement the anchor in the lightweight construction panel to the first and second cover plates (101, 111) and the support core (121).

13. The method for installing an anchor according claim 12, wherein after the engagement elements (42) are spread out behind the first cover plate (101), the expansion body (10) is retracted in a direction opposite the anchor installation direction (8) so that the engagement elements (42) are in contact with the first cover plate (101).

* * * * *